(12) United States Patent
Holma et al.

(10) Patent No.: US 7,085,248 B1
(45) Date of Patent: Aug. 1, 2006

(54) METHOD OF IDENTIFYING INFORMATION ADDRESSED TO A USER IN A COMMUNICATION SYSTEM AND A COMMUNICATION SYSTEM

(75) Inventors: Harri Holma, Helsinki (FI); Antti Toskala, Helsinki (FI)

(73) Assignee: Nokia Networks Oy, Espoo (FI)

( * ) Notice: Subject to any disclaimer, the term of this patent is extended or adjusted under 35 U.S.C. 154(b) by 833 days.

(21) Appl. No.: 09/763,946

(22) PCT Filed: Jul. 4, 2000

(86) PCT No.: PCT/FI00/00614

§ 371 (c)(1),
(2), (4) Date: Feb. 28, 2001

(87) PCT Pub. No.: WO01/03332

PCT Pub. Date: Jan. 11, 2001

(30) Foreign Application Priority Data

Jul. 5, 1999 (FI) .................................... 991534

(51) Int. Cl.
*H04Q 7/00* (2006.01)

(52) U.S. Cl. .............. 370/329; 370/331; 370/335; 455/436

(58) Field of Classification Search .......... 370/320, 370/329, 330, 331, 332, 333, 334, 335, 338, 370/342, 431, 522; 455/436, 437, 440, 442, 455/446
See application file for complete search history.

(56) References Cited

U.S. PATENT DOCUMENTS 5,822,315 A * 10/1998 de Seze et al. ............. 370/337
5,892,796 A * 4/1999 Rypinski .................... 375/232
5,905,733 A * 5/1999 Solve et al. ................ 370/522
5,953,323 A * 9/1999 Haartsen .................... 370/330
5,974,106 A  10/1999 Dupont et al. ............. 375/377
5,995,499 A  11/1999 Hottinen et al. ........... 370/337

(Continued)

FOREIGN PATENT DOCUMENTS

EP    0 851 636 A1    7/1998

(Continued)

OTHER PUBLICATIONS

The ETSI UMTS Terrestrial Radio access (UTRA) ITU-R-RTT Candidate Submission (Tdoc SMG2 260/98, May/Jun. 1998).

(Continued)

*Primary Examiner*—Ajit Patel
*Assistant Examiner*—Chirag Shah
(74) *Attorney, Agent, or Firm*—Pillsbury Winthrop Shaw Pittman LLP

(57) ABSTRACT

The invention relates to a method of identifying information addressed to a user in a communication system, and to a communication system comprising at least one transmitter and at least one receiver, in which communication system the transmitter is arranged to transmit on a shared channel data packets provided with a training sequence, on which channel two or more receivers are arranged to receive said data packets, and the receiver is arranged to generate a channel estimate on the basis of the training sequence. The communication system is arranged to provide the data packets addressed to different receivers or receiver groups with different training sequences, the receiver is arranged to identify and further process the data packets addressed to the receiver and whose training sequence the receiver identifies, and the receiver is arranged to ignore the data packets to whose training sequence the receiver does not identify.

41 Claims, 7 Drawing Sheets

U.S. PATENT DOCUMENTS

Figure 1A:
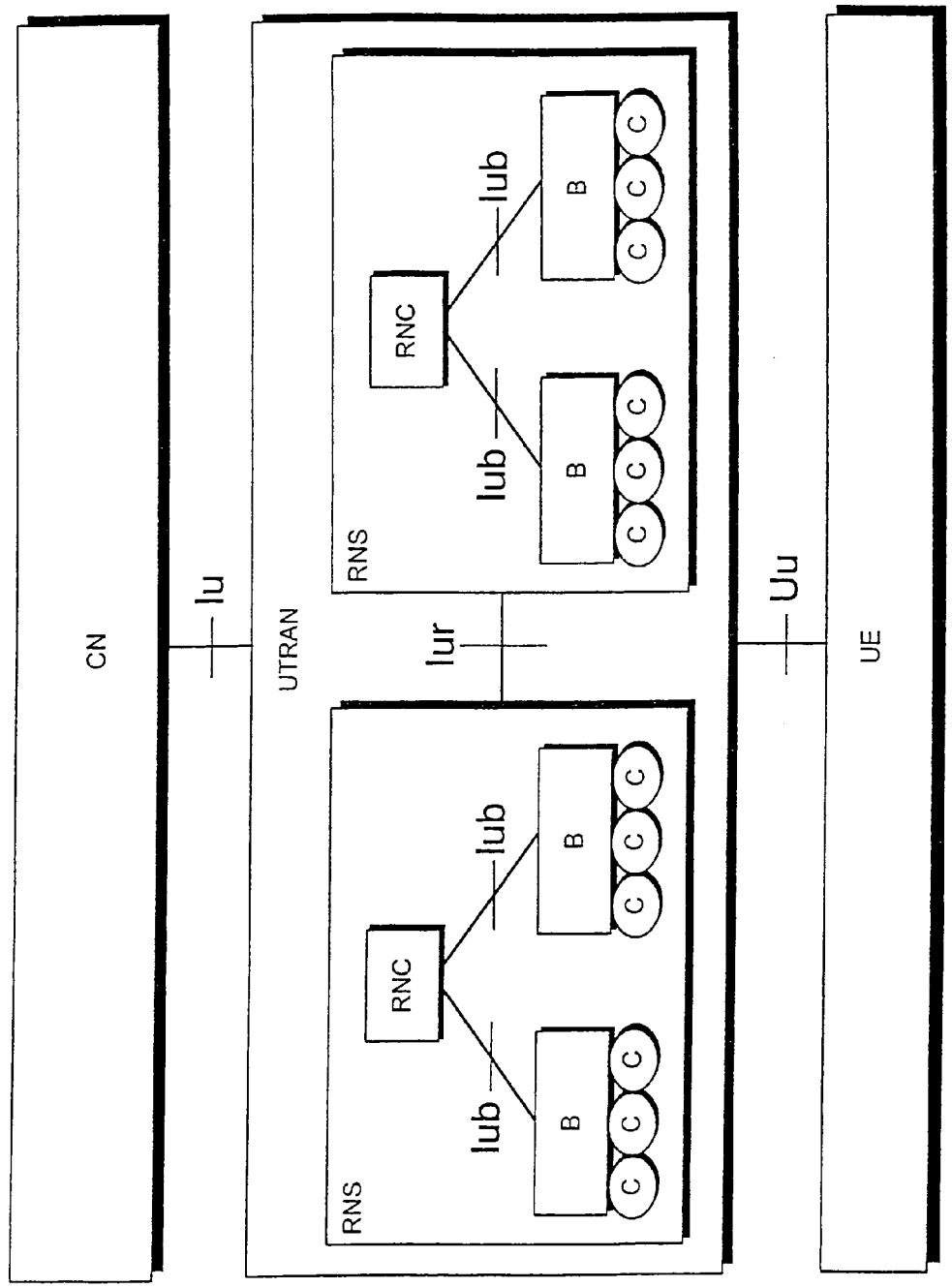

| | | | | |
|---|---|---|---|---|
| 6,009,334 | A | * 12/1999 | Grubeck et al. | 455/456.2 |
| 6,014,385 | A | * 1/2000 | Ayanoglu et al. | 370/458 |
| 6,141,393 | A | * 10/2000 | Thomas et al. | 375/347 |
| 6,163,571 | A | * 12/2000 | Asokan et al. | 375/225 |
| 6,167,031 | A | * 12/2000 | Olofsson et al. | 370/252 |
| 6,262,980 | B1 | * 7/2001 | Leung et al. | 370/336 |
| 6,404,778 | B1 | * 6/2002 | Hayashi et al. | 370/470 |
| 6,407,993 | B1 | * 6/2002 | Moulsley | 370/347 |

FOREIGN PATENT DOCUMENTS

| | | |
|---|---|---|
| WO | WO 98/07291 | 1/1998 |
| WO | WO 98/07291 | 2/1998 |

OTHER PUBLICATIONS

Finnish Patent Office Search Report re: 991534 mailed Aug. 30, 2000.

* cited by examiner

METHOD OF IDENTIFYING INFORMATION ADDRESSED TO A USER IN A COMMUNICATION SYSTEM AND A COMMUNICATION SYSTEM This application is the national phase of international application PCT/FI00/00614 filed Jul. 4, 2000 which designated the U.S.

FIELD OF THE INVENTION

The invention relates to a method of identifying information addressed to a user in a communication system, the method comprising transmitting, on a shared channel on which two or more receivers receive, data packets provided with a training sequence, and generating a channel estimate in a receiver on the basis of the training sequence.

The invention also relates to a communication system, comprising at least one transmitter and at least one receiver, in which communication system the transmitter is arranged to transmit on a shared channel data packets provided with a training sequence, on which channel two or more receivers are arranged to receive said data packets, and the receiver is arranged to generate a channel estimate on the basis of the training sequence.

BACKGROUND OF THE INVENTION

Digital radio systems offer users versatile services that require that the radio system be able to transfer speech and data at high rates. The nature of most services is still such that the need for data transmission is greater in the downlink direction, i.e. from the radio system to a terminal, such as when Internet-based browsers are used. Furthermore, the nature of data services is such that the need for data transmission is transient, and it is therefore not advantageous to continuously reserve a high capacity for a user from the point of view of efficient utilization of the resources of the radio system.

The duplex method TDD (Time Division Duplex) used in digital radio systems is a partial answer to the needs of the type described above and caused to a radio system by data traffic. In TDD systems, the uplink and downlink directions are separated from each other in time, and operate in the same frequency range. In some TDD-based systems, the borders between the transmission directions are not exactly defined, but more radio resources, such as timeslots, can be allocated to for example the downlink direction, if required. Furthermore, digital radio systems comprise various channels reserved for different purposes. Some channels are called dedicated channels, whereby data transmission resources, such as a given combination of a radio frequency, a timeslot and a spreading code, are reserved for data transmission between the radio network and a terminal. Some channels, in turn, are commons channels, whereby no data transmission resources are reserved between the radio network and a terminal, but all terminals can listen to all channels. In this case the radio system may comprise, for example, a common traffic channel shared by several users, on which a terminal can receive information at the same time as the terminal communicates in the radio network on a dedicated channel. A shared channel is particularly well suitable for use for data traffic, since it allows the capacity offered by a dedicated channel having a low data transmission capacity to be increased.

In some digital radio systems, information to be transmitted on radio channels is arranged into bursts, which are information packets in a specified format. An alternative to traffic in bursts is continuous transmission on a radio channel in a radio system. Depending on the channel, the information to be transmitted in bursts may contain either user data or control information associated with the use of the radio system; often both. The structure of a normal burst, used for example in data transmission, is such that in the middle the burst comprises a training sequence composed of a number of predetermined symbols known to the terminal. On both sides of the training sequence are data periods, and the burst further comprises guard periods for separating the burst from other bursts. The receiver compares the received training sequence with a known training sequence, and, on the basis thereof, is able to better demodulate the received signal. It is also known to insert into the burst an indicator of the length of a few data elements, such as a TFCI (Transport Format Combination Indicator), to supply the terminal with information on the use of the radio network, such as user bit rate. The TFCI indicator further allows for example the receiver of a burst to be indicated on a shared channel. Another way to transmit control information of the above type to a terminal is to use a control channel reserved for that purpose.

However, known methods have drawbacks. The use of TFCI indicators of the length of some bits is not necessarily adequate to reliably transmit to a user the required control information, because of interference at the radio interface. The use of TFCI bits in bursts further decreases the data transmission capacity of the system, since there is less space for actual user data in the bursts. The use of higher-level signalling for transmitting control information also takes up system capacity, since the control signals to be transmitted through the system require measures of several sub areas of the radio system.

BRIEF DESCRIPTION OF THE INVENTION

It is an object of the invention to provide an improved method and apparatus for identifying information addressed to a user in a communication system. This is achieved by the method of identifying information addressed to a user in a communication system, to be described next. In the method, data packets including a training sequence are transmitted on a shared channel on which two or more receivers receive, and a channel estimate is generated in the receiver on the basis of the training sequence. In the method, data packets addressed to different receivers or receiver groups are provided with different training sequences, identified as data packets addressed to the receiver, and those received data packets whose training sequence the receiver identifies are further processed in the receiver, and the data packets whose training sequence the receiver does not identify are ignored in the receiver.

The invention further relates to a communication system comprising at least one transmitter and at least one receiver, in which communication system the transmitter is arranged to transmit on a shared channel data packets including a training sequence, on which channel two or more receivers are arranged to receive said data packets, and the receiver is arranged to generate a channel estimate on the basis of the training sequence. The communication system is arranged to provide the data packets addressed to different receivers or receiver groups with different training sequences, the receiver is arranged to identify and further process the data packets addressed to the receiver and whose training sequence the receiver identifies, and the receiver is arranged to ignore the data packets whose training sequence the receiver does not identify.

It is an object of the invention to eliminate problems associated with the use an indicator or with system level signalling in assigning data of a shared channel to the right user. The basic idea of the invention is to use a training sequence in a burst to identify a receiver on a shared channel in a communication system.

In digital mobile communication systems, in which information to be transmitted on the radio path is encrypted by a spreading code known to the transmitter and the receiver, preferably only one spreading code in used on a shared channel. However, the invention is not restricted thereto, but even if the shared channel uses several spreading codes, the receiver identifies the information addressed to it by means of the training sequence.

The invention provides a plurality of advantages. In bad reception conditions on a radio channel the contents of the information received can be relied on with a higher certainty, since, the training sequence is used on a shared channel to identify bursts addressed to a user, and since the training sequence is in practice longer than the indicator field in a burst. It is also advantageous to use the training sequence to identify a burst, since because no burst symbols have to be used in the indicator field, the data parts of a burst can be longer compared with a situation in which the indicator field in a burst is reserved for indicating to which user the burst is addressed.

When the quality of a channel is estimated by means of the training sequence, in the estimation a threshold value, which is obtained by known methods, is preferably used. A threshold value for channel quality is preferably generated by means of data packets to be transmitted on a channel dedicated to a user. In accordance with a preferred embodiment of the invention, a dedicated channel is allocated to a user simultaneously with a shared channel. In this case, the disturbances the data transmitted on the dedicated channel is subjected to are a good point of comparison to the disturbances on the shared channel. The terminal estimates a received burst by reading the data contents of the burst in case the channel estimate calculated for the received burst exceeds the threshold value. If the channel estimate is below the threshold value, the received burst is not read, i.e. it is ignored. As an additional filter for the received bursts, the CRC (Cyclic Redundancy Test) can be performed on the received bursts in addition to the aforementioned threshold value test, whereby the certainty that the burst was intended for the user is still higher.

In accordance with an embodiment of the invention, the training sequence that the receiver is to use when identifying data packets transmitted on a shared channel is delivered to the terminal before the traffic intended for the terminal starts on the shared channel. The training sequence is preferably transmitted to a mobile phone at the set-up stage of a dedicated connection. In this case, for example a training sequence to be transmitted on a dedicated channel and a training sequence to be transmitted on a shared channel are signalled to the user on for example a control channel FACH (Forward Access CHannel). It is also feasible that the same training sequence is used on both the dedicated and the shared channels.

The invention is preferably applicable in a mobile communication system using the time and code division multiple access method, such as the UMTS (Universal Mobile Telephony System). The invention is particularly usable in a cellular radio network employing the TDD (Time Division Duplex), without, however, being restricted thereto. It is the basic idea of the invention that the same training sequence is used in several bursts to be sent in each timeslot, whereby all bursts are addressed to a given user. This provides the advantage that a user's data transmission capacity can be temporarily significantly increased. Furthermore, the invention is preferably applicable in point-to-multipoint type of broadcast, in which a radio network transmits the same training sequence to several users, and several users receive the same information.

Figure 1B:
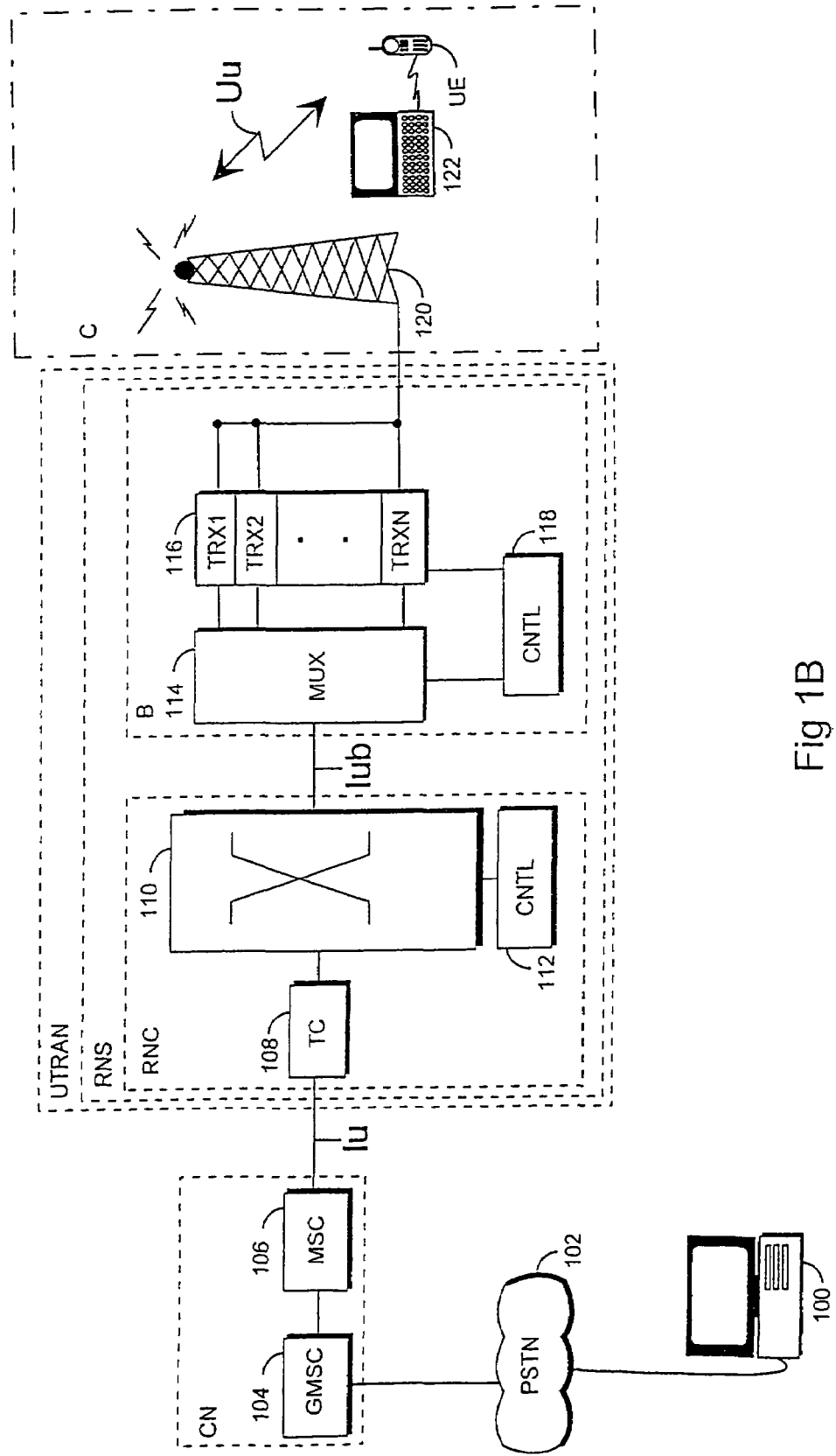
Figure 2:
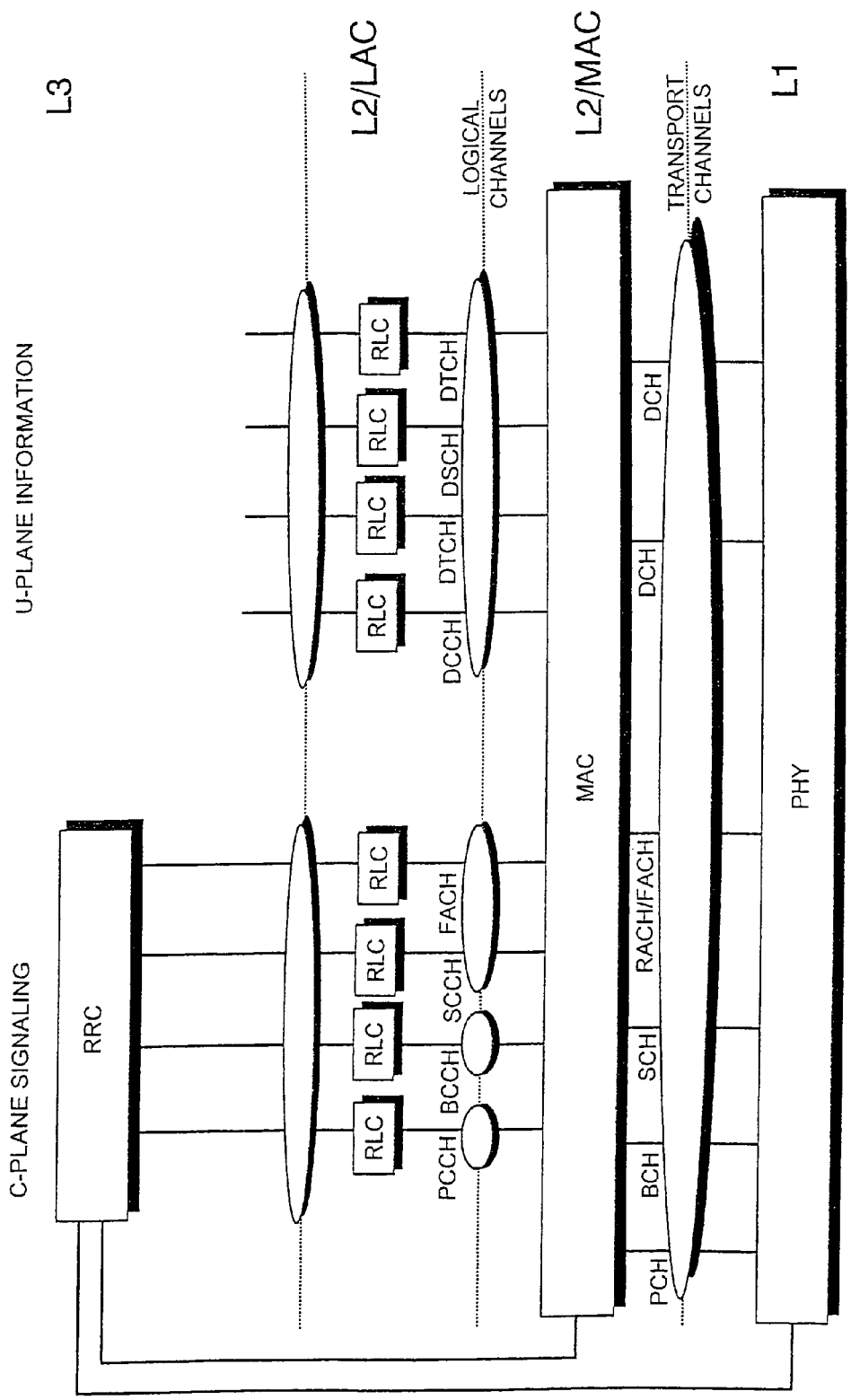
Figure 3A:
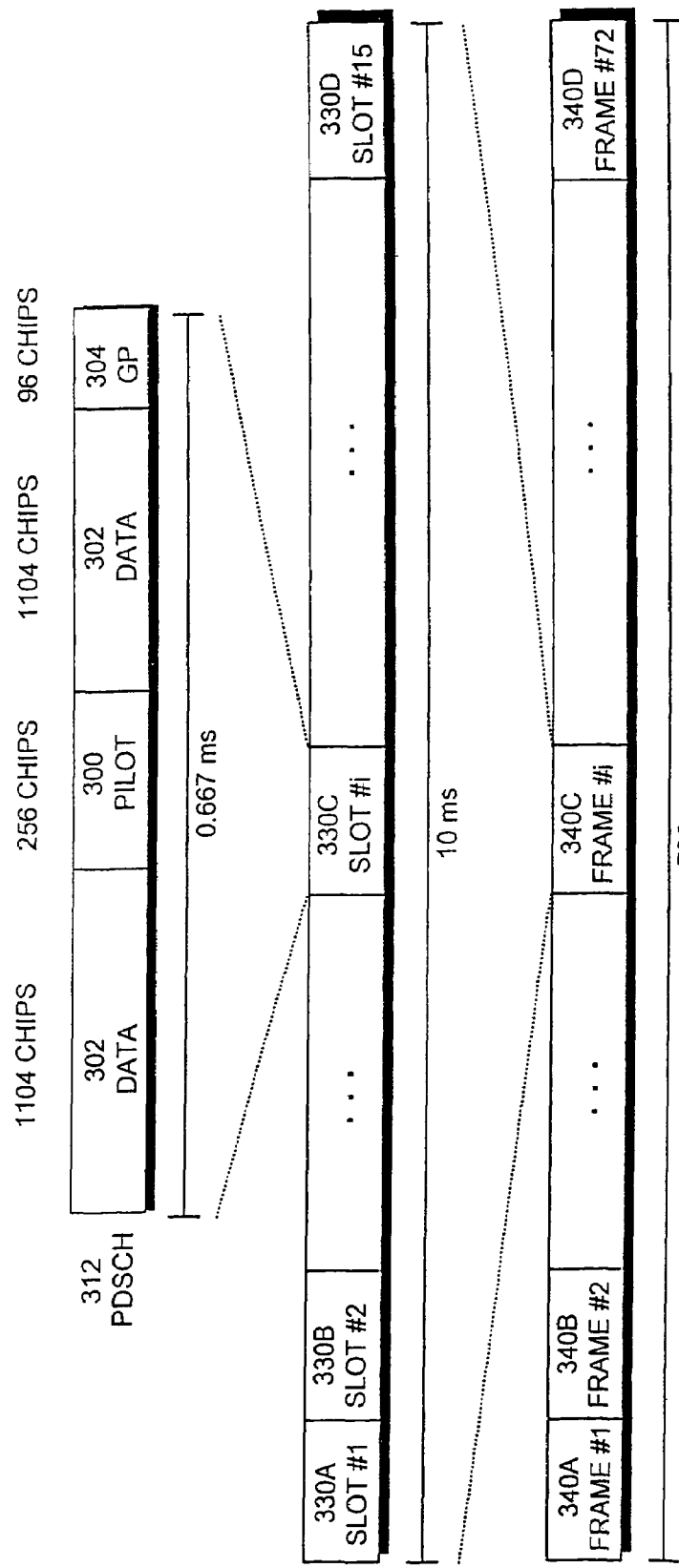
Figure 3B:
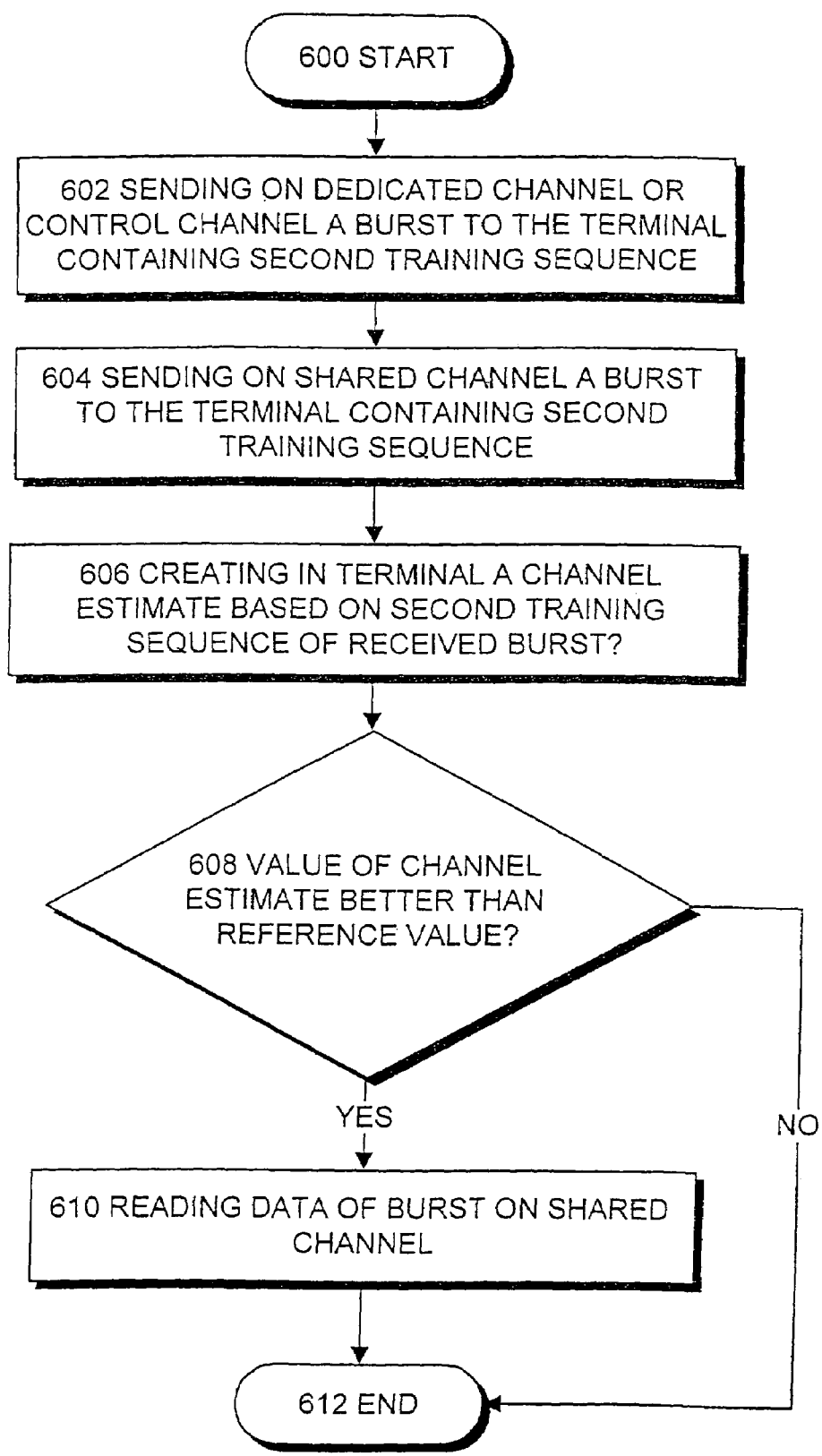
Figure 4:
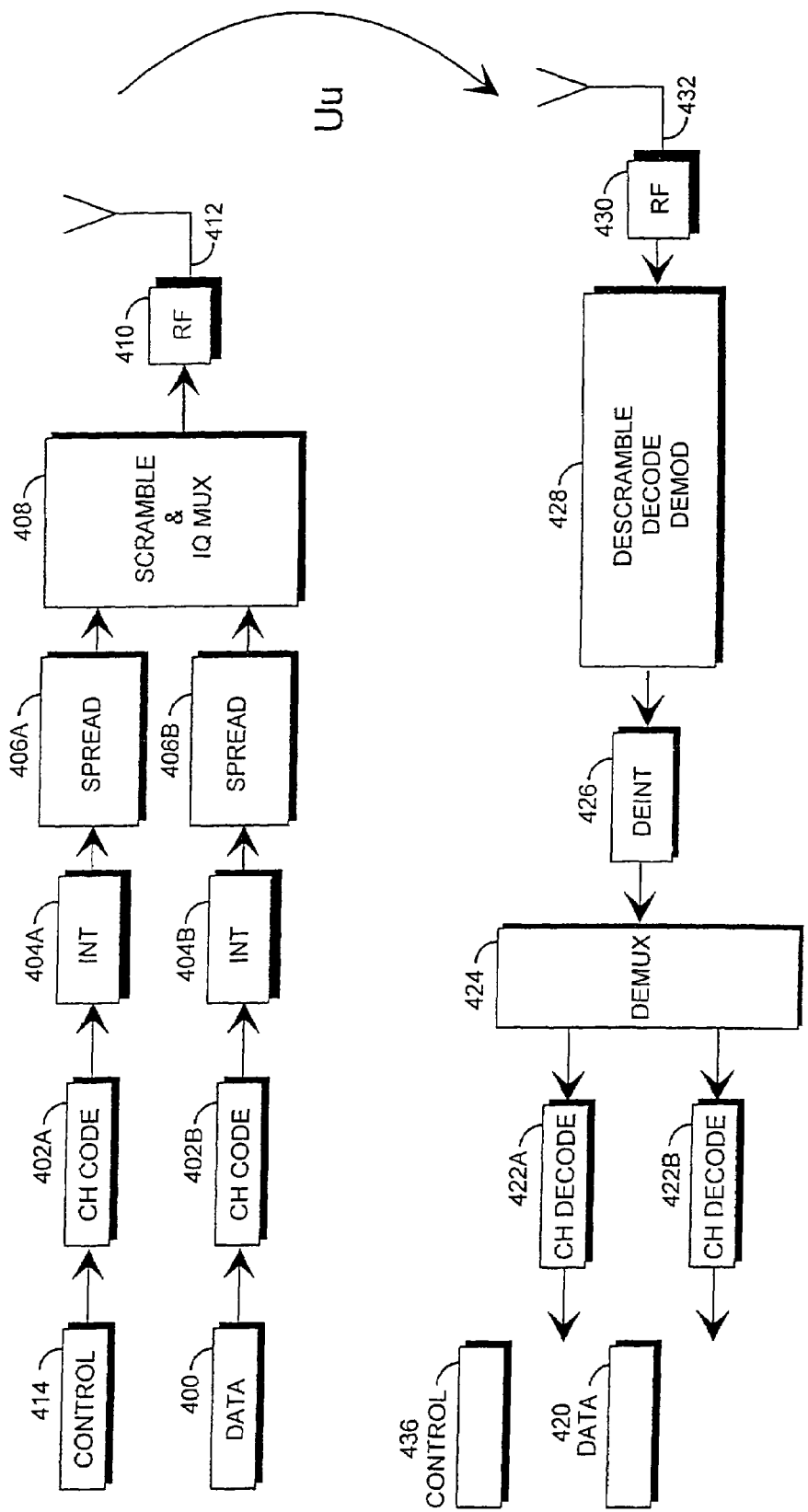
Figure 5:
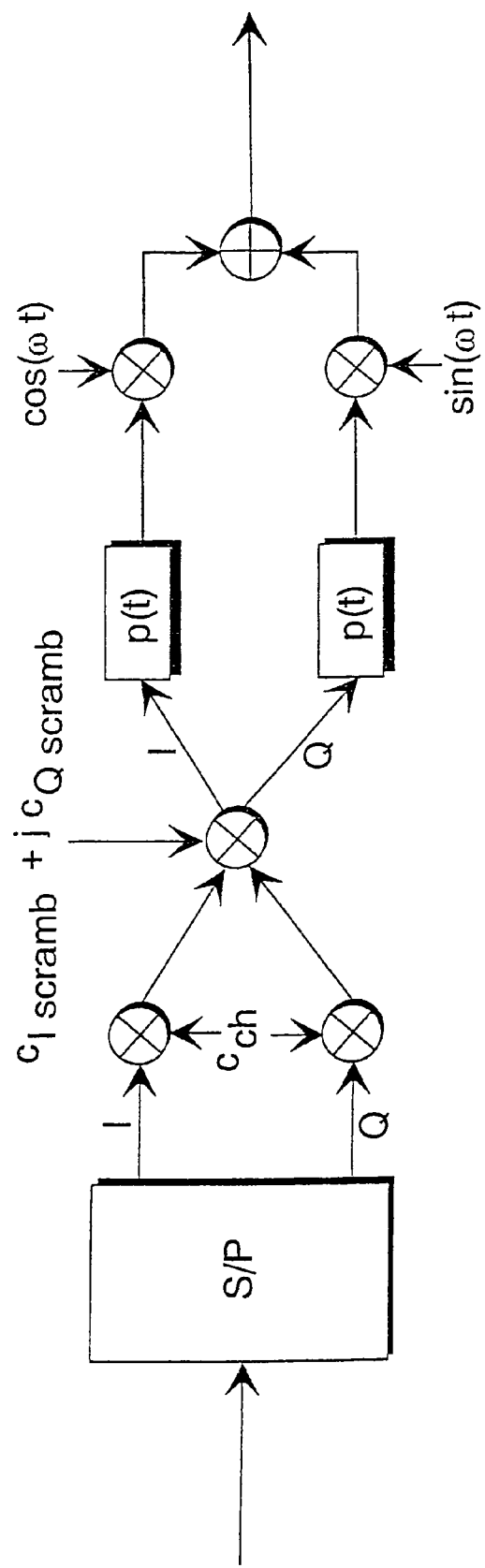

The invention will be described more closely in connection with preferred embodiments with reference to the attached drawings, in which FIG. 1A schematically shows the UMTS mobile telephone system, FIG. 1B shows the UMTS mobile telephone system described by means of the GSM network, FIG. 2 shows the structure of a protocol stack used at the radio interface of the UMTS mobile telephone system, FIG. 3A shows the implementation of a channel in a mobile telephone system on the physical level, FIG. 3B is a flow chart showing the use of the training sequence of a burst for the inventive idea, FIG. 4 shows the spreading and modulation performed in a transmitter, FIG. 5 shows the inventive solution for a combined descrambling, despreadcoding and demodulating block of the receiver shown in FIG. 4.

In the context of the present invention, a communication system refers to for example the public land mobile network PLMN, represented by for example the second generation digital mobile communication system GSM (Global System for Mobile Communication) and the third generation mobile communication system UMTS, which is being standardized. In addition to the aforementioned mobile communication systems, a communication system may comprise parts of fixed telecommunication networks, such as the PSTN (Public Services Telephone Network). A shared channel in a communication system refers to a traffic or control channel on which several receivers of data can communicate simultaneously. In mobile communication systems, a receiver refers in practice to a terminal comprising means for transmitting and receiving information in the system. A terminal, in turn, is for example a mobile telephone, a computer or other device comprising the aforementioned functionalities.

In digital mobile communication systems, information is often transmitted in data packets of a specified form which are placed in bursts transmitted on the radio path. In addition to actual data addressed to a user, the bursts also contain other data parts. For example in the GSM and UMTS systems, the interference experienced by a user in channel signalling is estimated by means of the training sequence included in the burst. The training sequence is a number of symbols, which are known to the transmitter and the receiver and by means of which the receiver is able to determine the distortion caused to the information by the transmission path and to use the distortion information to correct the data, if required.

DETAILED DESCRIPTION OF THE INVENTION

The invention is preferably usable in different mobile telephone systems employing the time and code division multiple access method (TDMA/CDMA). The examples describe the use of the invention in a universal mobile telephone system using a broadband code division multiple access method implemented by the direct sequence technology, without, however, restricting the invention thereto. Accordingly, the IMT-2000 mobile telephone system developed by ARIB (Association of Radio Industries and Businesses) in Japan, and the universal mobile telephone system (UMTS) developed in Europe are systems according to the invention. The examples are based on a description of the WCDMA system, on which additional information can be found in the ETSI (European Telecommunications Standards Institute) specification '*The ETSI UMTS Terrestrial Radio Access (UTRA) ITU-R RTT Candidate Submission (Tdoc SMG2 260/98, May/June* 1998)', which are incorporated herein by reference. The radio network part of the UMTS operates in two modes, FDD (Frequency Division Duplex) and TDD (Time Division Duplex). FDD employs a paired frequency band, in which different frequency ranges are defined for the uplink and downlink directions. TDD operates on one frequency band, in which the uplink and downlink directions utilize the same radio frequency, but different timeslots within said frequency range.

Referring to FIGS. 1A and 1B, the structure of a universal mobile telephone system will be described. The figures show only the blocks relevant to the invention, but it is obvious to a person skilled in the art that a conventional mobile telephone system also comprises other functions and structures, which need not be described herein. The main parts of a mobile telephone system are a core network CN, the UMTS terrestrial radio access network (UTRAN) and user equipment (UE). The interface between the CN and the UTRAN is called Iu, and the air interface between the UTRAN and the UE is called Uu. All functionality connected with a radio, connection and the mobility of the UE on cell level is performed at the UTRAN. No dedicated radio connection exists to the UE; the registration stages caused by the mobility of the UE are carried out in the CN.

The UTRAN is composed of radio network subsystems (RNS). The RNS can be further divided into serving RNSs (SRNS) and drifting RNSs (DRNS), which offer radio resources to the UE via the SNRS, when required. The interface between the RNSs is called Iur. The RNS is composed of a radio network controller RNC, which is in charge of the handover decisions caused by the mobility of the UE. The RNC, in turn, communicates via the interface Iub with one or more nodes B, i.e. a base stations, which are also functionally under the RNS. The coverage area, i.e. cell, of node B is denoted by C in FIGS. 1A and 1B.

As the presentation in FIG. 1A is very abstract, it is clarified in FIG. 1B by showing the parts of the GSM system that approximately correspond to the parts of the UMTS. It is clear that the presented mapping is by no means a binding one but an approximation, because the responsibilities and functions of the parts of the UMTS are still being planned.

In accordance with FIG. 1B, a circuit-switched connection can be set up from the UE to a subscriber terminal 100 connected to the public switched telephone network PSTN 102. The UE can be for example fixed, vehicle-mounted or a portable mobile telephone. The base station B comprises a multiplexer 114, transceivers 116, and a control unit 118, which controls the operation of the transceivers 114 and the multiplexer 116. The multiplexer 116 serves to place the traffic and control channels employed by a plurality of transceivers 114 onto a link Iub, which is the interface between the base station B and the RNC. There is a connection from the transceivers 116 of the base station B to an antenna unit 120 for implementing a bi-directional radio connection Uu to the UE. The structure of the frames transmitted on the bi-directional radio connection Uu is precisely defined.

The base station controller RNC comprises a group switch field 110 and a control unit 112. The RNC typically manages the following: radio resources, control of handover between cells, power control, timing and synchronization, paging of terminals. The group switch field 110 is used for switching speech and data, and for combining signalling circuits. The base station system constituted by the base station B and the base station controller RNC additionally comprises a transcoder 108. The distribution of work and the physical structure between the RNC and the base station B can vary depending on the implementation, but typically the base station B attends to the implementation of the radio path in the aforementioned manner. The transcoder 108 is usually located as close to a mobile switching centre 106 as possible, since this allows speech to be transmitted in the form of the mobile telephone system between the mobile telephone centre 106 and the RNC, thus saving transmission capacity. The transcoder 108 converts the different digital coding forms for speech employed between a public telephone network and a radio telephone network so as to make them compatible, for example the 64-kbps format used in a cellular radio network to another (for example 13-kbps) form, and vice versa. The equipment required is not described herein, but it may be stated that only speech, and not other data, is converted in the transcoder 108. The control unit 112 attends to call control, mobility management, collection of statistics, and signalling. The core network CN is composed of the infrastructure of the mobile telephone system, which is not part of the UTRAN. Out of the devices in the core network CN, FIG. 1B illustrates the mobile switching centre 106 and a gateway mobile switching centre 104, which handles mobile telephone system connections to a telecommunication network outside the mobile telephone system, in this case to the public telephone network 102. The CN sees to the UE's mobility management via the UTRAN when there is no dedicated data transmission resources or connection reserved for user data transmission.

Referring next to FIG. 2, the structure of the radio interface Uu is a three-layer protocol stack, whose layers include a physical layer L1, a data link layer L2 and a network layer L3. Layer L2 is further divided into two sublayers, LAC (Link Access Control) and MAC (Medium Access Control). The network layer L3 and the LAC are further divided into control (C) and user (U) levels. The physical layer L1 offers information transmission services to transport channels MAC and to higher levels. Layer L2/MAC, in turn, transmits information between the physical transmission channels and the logical channels higher in the protocol stack. Referring to FIG. 2, it may be stated by way of example, that the logical control channel BCCH (Broadcast Control Channel) is implemented on the transmission channel BCH, the logical traffic channel DSCH is implemented on the transmission channel DSCH and the logical control channel FACH is implemented on the transmission channel DSCH.

Transmission channels are divided into dedicated and common channels. A user using a dedicated channel is identified by means of the physical channel, whereby, for example in the UTRAN TDD mode, a timeslot in the physical channel corresponds to a user. On a common channel, which may be used simultaneously by several users, other methods have to be used for user identification such as using the TFCI field in a burst to be transmitted on a physical channel or by indicating the users by means of higher-level signalling.

In the following, transmission channels and physical channels will be described on the basis of the UTRAN FDD mode, without, however, being limited thereto. Table 1 shows the mapping of transmission channels to physical channels.

TABLE 1

Location of transmission channels on physical channels

| Transmission channel | Physical channel |
|---|---|
| BCH | Primary CCPCH |
| FACH | Secondary CCPCH |
| PCH, RACH, FACH | PRACH |
| DCH, PCH, FAUSCH | DPDCH, DPCCH, SCH |
| DSCH | PDSCH |
| DSCH control channel | PSCCCH, AICH |

There is only one type of dedicated transmission channel, a dedicated channel DCH. The DCH is used for both the uplink and downlink direction for transmitting user and control information between the network and the UE. There are several types of common transmission channels: a broadcast channel BCH is used in the downlink direction to transmit to the terminals Information on cells; on a paging channel PCH, location information is inquired of a terminal when the system is unaware of the location of the terminal; on a forward access channel FACH, information is transmitted to a terminal when the base station knows the location of the terminal; on a random access channel RACH, a terminal may transmit uplink control information regarding for example the set-up of a connection; on a synchronization channel SCH, the system can transmit synchronization information to the terminals; on a downlink shared channel DSCH, data can be transmitted to several UEs sharing the same channel; on a downlink shared channel control channel DSCH, control information regarding the use of the DSCH can be transmitted to a UE operating on the DSCH. The invention is not limited to which control channel is associated with the use of the DSCH, but all the same, a control channel preferably exists. It is feasible that the system has for example no DSCH control channel at all, but the signalling associated with the use of the DSCH is attended to for example on the logical control channel FACH at the set-up stage of a connection or on the logical dedicated traffic channel DCH during the connection. In this example, signalling associated with the use of the DSCH means for example that the terminal is informed about the chance to use a shared channel. Furthermore, in accordance with the invention, pilot symbols, by means of which a terminal identifies the bursts addressed to it on the DSCH, are preferably signalled to the terminal on the control channel.

Referring still to Table 1, the physical channels corresponding to the above-described transmission channels are described in the right-hand column of the table. Two dedicated physical channels, DPDCH (Dedicated Physical Data Channel) and DPCCH (Dedicated Physical Control Channel), are defined in the uplink direction. The uplink DPDCH is used to transmit data that is generated on layer L2 and upper, whereas the DPCCH is used to transmit control information generated on layer L1. In addition, one common physical channel, PRACH (Physical Random Access Channel) has been defined in the uplink direction and is used to transmit information associated with the RACH transmission channel. Only one dedicated physical channel is defined in the downlink direction, the downlink dedicated physical channel DPCH. Compared with uplink, where there are two dedicated physical channels, the downlink DPCH can be considered to be a time multiplexed combination of a downlink DPDCH and DPCCH. In the downlink direction, two physical channels are defined, a primary CCPCH (primary Common Control Physical Channel) and a secondary CCPCH (secondary Common Control Physical Channel). The primary CCPCH transmits information of the BCH transmission channel, and the CCPCH transmits information of the FACH transmission channel.

The frame and burst structures used on physical channels differ from each other depending on which physical channel the transmission is carried out on. Referring to FIG. 3A, the frame structure of the UTRA TDD mode PDPCH physical channel will be explained by way of example. Frames 340A to 340D are sequentially numbered from one to 72, and they form a 720—ms long super frame. The length of one frame, for example 340C, is 10 ms. Frame 340C is divided into sixteen timeslots 330A to 330D, each of which, for example 330C, has a 0.625-ms-long timeslot. Each timeslot can be allocated simultaneously to several different users and therefore spreading codes are used to separate the users. A data packet to be transmitted in timeslot 330C is called a burst, and the burst contains 2560 chips. According to the spreading codes, the bursts of one timeslot can be addressed to different users, but all of them can also be directed to the same user. Up to eight bursts can be placed in one uplink timeslot if the bursts are intended for different users. Up to 9 or 10 bursts can be placed in one downlink timeslot. Two structurally different burst types, burst#1 and burst#2, have been defined for the DPCH channel. In the burst of FIG. 3A, which is of the type burst#2, chips 0 to 1103 contain data, chips 1104 to 1359 contain a midamble, chips 1360 to 2463 again data, and at the end of the burst is a 96-chip long guard period. A burst having such contents can be used on a downlink channel, for example. The middle of a burst used on an uplink channel is usually longer to facilitate the sorting of bursts coming from different users to a base station.

TFCI information can be sent in both burst types, burst#1 and burst#2. The network and the terminal agree upon the use of TFCI in bursts at the set-up stage of a call, but it can also be agreed upon during an ongoing call. The terminal and the network may also decide upon the number of bits to be reserved for TFCI on both sides of the midamble. TFCI information is sent to all users once per frame, and TFCI is spread using the same spreading code as in the data parts of the burst.

In the solution of the invention, TFCI indicators are not used around pilot symbols in bursts on a shared channel in a cellular radio network, but the users are distinguished on the basis of different training sequences. A training sequence used on a shared channel is signalled in user data on a dedicated traffic channel DCH, a downlink access channel FACH, or on some other channel. It is not relevant to the invention on which channel the training sequence used on a shared channel is signalled to the user, but it is essential that there exists some other channel on which said control information is transmitted to the terminal.

In an embodiment the solution of the invention is used in a cellular radio network employing the time division multiple access method, which allows several bursts to be sent in one timeslot. However, preferably the same training sequence is used in all the bursts sent in one timeslot of a shared channel, whereby all bursts in one timeslot are addressed to the same user. This is the case even though different spreading codes can be used in the bursts of the same timeslot. In this case the bursts are identified on the basis of the training sequence.

Reference is next made to FIG. 3B, which shows an embodiment of the method of the invention in the form of method steps. In the initial step 600, radio system resources are allocated to a terminal, and the terminal listens to the control channel, for example DSCH control, of a shared channel, a dedicated channel reserved for the terminal, such as the DCH, a system control channel, such as the FACH or some corresponding channel. In step 602 the terminal receives one or more bursts on said control channel, in which bursts the system sends to the terminal a training sequence that the terminal is to use when identifying bursts on a shared channel, such as the DSCH. In an embodiment of the invention, only one training sequence is allocated to the my terminal, which it uses on both the control and shared channels. In this case the information transmitted on the control channel to the terminal states for example that the terminal should listen to a shared channel. Referring to step 604, the terminal listens to a shared channel on which the system sends to the terminal a burst containing said training sequence that was transmitted on a control channel. On the basis of the training sequence in the burst, the terminal generates a channel estimate, i.e. it tends to estimate how the radio path has distorted the data contents of the burst. There are several methods of checking the quality of a transmission unit and a packet. The quality of a received transmission unit can be determined by generating the C/I ratio (Carrier/Interference) of the transmission unit by means of the training sequence. The quality can also be determined by studying the SIR (Signal Interference Ratio), by generating the bit error rate of the transmission unit, or by studying the ratio of chip energy to disturbance power frequency $E_c/I_0$. These are examples of determining the quality of a transmission unit or a packet; however, any other known method of measuring the quality can be used. A threshold value for the quality of a connection can be generated by any of the methods described or any corresponding method preferably by means of the control channel in use. The use of a control channel in generating the threshold value is not necessary; some predetermined reference values can be used as the threshold value. In step 608, the received burst, which was generated on a shared channel, is used to compare the generated quality value with the threshold value. If the obtained quality value exceeds the threshold value, the burst is considered to have been intended for the user and the data contents of the burst are read. If the quality value is less than the threshold value, the received burst is not read. The above steps 604 to 612 are repeated as long as the intention is to read information from the shared channel, i.e. for example as long as the dedicated traffic channel is allocated to the user.

In the following, the steps related to the transmission of information to the physical channels of the radio path by means of the transmitter-receiver technology will be described by means of Figures-4 and 5. FIG. 4 describes the operation of a radio transmitter/radio receiver pair on a general level. The radio transmitter may be located at a base station B or user equipment UE, and the radio receiver at the user equipment UE or the base station B. The upper part of FIG. 4 shows the essential operations of a radio transmitter in such a way that the process steps of a control channel are described above and, under them, the process steps of a data channel before the channels are combined and sent to a physical channel of a radio connection. Services to be placed on a physical channel include speech, data, moving or still video image and system control channels. Different services require different source coding means, for instance speech requires a speech codec, but for the sake of clarity, the source coding means are not shown. For example the pilot bits, which form the training sequence of a burst and which the receiver uses for channel estimation and in conclusions relating to the use of the shared channel in accordance with FIG. 3B, are placed on the control channel 414. User data 400 is placed on the data channel. Thus different channel coding is performed on different channels in blocks 402A and 402B. Channel coding includes for example different block codes, an example of which is a cyclic redundancy check CRC. In addition, convolution coding and its different variations, such as punctured convolution coding or turbo coding, are typically used. However, the pilot bits are not channel coded, since the intention is to find out the distortions caused to the signal by the channel. When the different channels are channel coded, they are interleaved in an interleaver 404A, 404B. The interleaving serves to facilitate error correction. During interleaving, the bits of different services are mixed together in a certain manner, whereby a transient fading on the radio path does not necessarily render the transmitted information unidentifiable. The interleaved bits are then spread by a spreading code in blocks 406A, 406B. The chips thus obtained are scrambled by a scrambling code and modulated in block 408, whose operation will be described in greater detail in FIG. 5. The individual signals obtained from different channels are combined in block 408 for transmission via the same transmitter. Finally, the combined signal is applied to radio frequency parts 410, which may comprise different power amplifiers and filters for restricting the bandwidth. The closed loop control employed in transmission power control usually controls the transmission power control amplifier in this block. The analog radio signal is transmitted to the radio path Uu via an antenna 412.

The lower portion of FIG. 4 illustrates the essential functions of a radio receiver. The radio receiver is typically a RAKE receiver. An analog radio frequency signal is received from the radio path Uu by an antenna 432. The signal is applied to radio frequency parts 430 comprising a filter for blocking frequencies outside the desired frequency band. In block 428, the signal is then converted into an intermediate frequency or directly into baseband, and in this form the signal is sampled and quantized. Because the signal in question is a multipath propagated signal, efforts are made to combine the signal components propagated on different paths in block 428, which, in accordance with prior art, comprises the actual RAKE fingers of the receiver. The interleaving of the obtained physical channel is removed in de-interleaving means 426, and the de-interleaved physical channel is divided in a demultiplexer 424 into data streams of different channels. Each of the channels is directed to a de-channel-coding block 422A, 422B, in which the channel coding used in transmission, e.g. block coding and convolution coding, is removed. A Viterbi decoder is preferably used to decode the convolution coding. Each transmitted channel 420A, 420B can be applied to any necessary further processing, for instance data 420 is applied to a computer 122, connected to the user equipment UE and shown in FIG. 1B. The system control channels are applied to a control part 436 in the radio receiver.

FIG. 5 shows in greater detail the spreading of a channel with a spreading code and the modulation thereof. In the figure, a channel bit stream arrives from the left at block S/P, in which each two-bit sequence is converted from series form to parallel form, i.e. one bit is applied to signal branch I and the other to signal branch Q. The signal branches I and Q are then multiplied with a spreading code $c_{ch}$, which spreads the relatively narrowband information to a wide frequency band. The spreading code can be the same or different for each branch. Each connection Uu has its own spreading code(s) with which the receiver identifies transmissions intended for it. The signal is then scrambled by multiplying it with a scrambling code $c_{I\ scramb} + J\ c_{Q\ scramb}$, which is different for each transmitter. The pulse form of the obtained signal is filtered with filters p(t). Lastly, the signal is modulated to a radio frequency carrier by multiplying its different branches that are shifted from each other 90 degrees, and the branches so obtained are combined into one carrier, which can be sent to the radio path Uu, bar any filtering or power amplification. The modulation described is QPSK (Quadrature Phase Shift Keying). Instead of the I/Q multiplexing described, time multiplexing can also be used, in which data and control channels are placed in succession in the time domain. However, in this case the time difference between the channels is so small that the interference estimated from the control channel can be assumed to be the same in the data channel, too.

The maximum number of different, simultaneously used, typically mutually orthogonal spreading codes is 256. For example, when a 5-MHz carrier is used at the rate 4.096 Mchps on UMTS downlink, the spreading factor 256 corresponds to a transmission rate of 32 kbps; similarly, the highest feasible transmission rate is obtained with the spreading factor 4, the data transmission rate being 2,048 kbps. Consequently, the transmission rate on a channel varies stepwise 32, 64, 128, 256, 512, 1,024 and 2,048 kbps, the spreading factor varying similarly 256, 128, 64, 32, 16, 8 and 4. The data transmission rate available to a user depends on the channel coding used. For example, when ⅓ convolution coding is used, the user's data transmission rate is about ⅓ of the data transmission rate of the channel. The spreading factor indicates the length of the spreading code. For example, spreading code (1) corresponds to spreading factor one. Spreading factor two has two mutually orthogonal spreading codes (1,1) and (1, −1). Further, spreading factor four has four mutually orthogonal spreading codes: spreading codes (1,1,1,1) and (1,1, −1, −1) under an upper layer spreading code (1,1), and spreading codes (1, −1,1, −1) and (1, −1, −1,1) under a second upper layer spreading code (1, −1). This way the generation of spreading codes continues in the code tree towards the lower levels. The spreading codes of a given level are always mutually orthogonal. Similarly, a spreading code of a given level is orthogonal to all spreading codes that are on following levels and are derived from a second spreading code of the same level. In transmission, one symbol is multiplied with a spreading code, whereby the data is spread to the frequency band to be used. For example, when spreading code 256 is used, 256 chips represent one symbol. Similarly, when spreading code 16 is used, 16 chips represent one symbol.

Although the invention has been described above with reference to the example in the attach drawings, it is obvious that the invention is not restricted thereto, but can be modified in a plurality of ways within the scope of the inventive idea disclosed in the attached claims.

The invention claimed is:

1. A method of identifying information addressed to a user in a communication system, the method comprising:
    transmitting, on a shared channel on which at least one receiver receives, data packets provided with a training sequence, wherein data packets addressed to at least one of different receivers and different receiver groups are provided with different training sequences;
    generating a channel estimate value in a first receiver of the at least one of different receivers and different receiver groups on the basis of the training sequence;
    receiving data packets addressed to the first receiver;
    attempting To identify the received data packets;
    processing, in the first receiver, received data packets having a training sequence That the first receiver identifies; and
    ignoring, in the first receiver, received data packets having a training sequence that the first receiver does not identify.

2. The method of claim 1, wherein attempting to identify the received data packets comprises comparing, in the receiver, the generated value of the channel estimate with a threshold value indicative of the quality of the channel, and
    wherein processing the received data packets is performed when the generated value of the channel estimate exceeds the threshold value, and ignoring the received data packets is performed when the generated value of the channel estimate is less than the threshold value.

3. The method of claim 2, wherein the generated channel estimate value is a signal interference ratio, a carrier/interference ratio, a bit error rate, or a ratio of chip energy to disturbance power frequency.

4. The method of claim 1, wherein the training sequence that the first receiver is to use on the shared channel is indicated to the first receiver before handover to the shared channel.

5. The method of claim 2, wherein the first receiver receives allocated time both on the shared channel and at least one parallel, dedicated channel.

6. The method of claim 5, wherein the at least one parallel dedicated channel is a control channel.

7. The method of claim 5, wherein each parallel dedicated channel uses a different training sequence.

8. The method of claim 5, wherein the first receiver uses, on the shared channel, the same training sequence as on the at least one parallel dedicated channel.

9. The method of claim 1, wherein the training sequence is indicated to the first receiver via at least one of a common control channel and a parallel dedicated channel before handover to the shared channel.

10. The method of claim 1, further comprising:
    performing a cyclic redundancy check on identified data packets of the shared channel before processing.

11. The method of claim 5, wherein the threshold value for the channel estimate is generated on the basis of a data packet received on the at least one parallel dedicated channel.

12. The method of claim 1, wherein the communication system is a time division multiple access type of cellular radio network, the shared channel is a timeslot, and the data packets are radio bursts to be sent in the timeslot and include at least the training sequence and data.

13. The method of claim 10, wherein a time division duplex principle is used on a carrier of the shared channel.

14. The method of claim 10, wherein a plurality of radio bursts are simultaneously sent in a timeslot of the shared channel based on a code division multiple access principle using different spreading codes, and wherein different training sequences are used in radio bursts for at least one of different receivers and different receiver groups.

15. The method of claim 12, wherein the first receiver simultaneously receives a plurality of radio bursts with different spreading codes and accepts at least one radio burst having a training sequence that the first receiver identifies.

16. The method of claim 15, wherein the first receiver attempts to identify a radio burst by both the training sequence and the spreading code.

17. The method of claim 12, wherein the shared timeslot is allocated one time division multiple access frame at a time, and the training sequence is used to indicate to which receiver or receiver group the timeslot is allocated in each time division multiple access frame.

18. A communication system, comprising:
    at least one transmitter that transmits data packets wherein data packets addressed to at least one of different receivers and different receiver groups are provided with different training sequences; and
    at least one receiver, wherein the at least one transmitter transmits, on a shared channel, data packets provided with a training sequence, on which channel the at least one receiver receives the data packets, generates a channel estimate on the basis of the training sequence, processes received data packets having a training sequence that the at least one receiver identifies, and ignores received data packets having a training sequence that the at least one receiver does not identify.

19. The communication system of claim 18, wherein the at least one receiver compares a generated value of the channel estimate with a threshold value indicative of a quality of the channel, processes the received data packet when the generated value of the channel estimate exceeds the threshold value, and ignores the received data packet when the generated value of the channel estimate is less than the threshold value.

20. The communication system of claim 19, wherein the channel estimate value is a signal interference ratio, a carrier/interference ratio, a bit error rate, or a ratio of chip energy to disturbance power frequency.

21. The communication system of claim 18, wherein the at least one transmitter indicates the training sequence that the at least one receiver is to use on the shared channel before handover to the shared channel.

22. The communication system of claim 18, wherein the at least one receiver receives allocated time both on the shared channel and at least one parallel dedicated channel.

23. The communication system of claim 22, wherein the at least one parallel dedicated channel is a control channel.

24. The communication system of claim 22, wherein the communication system uses a different training sequence on each dedicated channel.

25. The communication system of claim 22, wherein the at least one receiver uses, on the shared channel, the same training sequence as the at least one receiver uses on the at least one parallel dedicated channel.

26. The communication system of claim 18, wherein the at least one transmitter indicates the training sequence to the at least one receiver via at least one of a common control channel and a parallel dedicated channel before handover to the shared channel.

27. The communication system of claim 18, wherein the at least one receiver performs a cyclic redundancy check on the identified data packets of the shared channel before further processing.

28. The communication system of claim 22, wherein the at least one receiver generates a threshold value for the channel estimate on the basis of a data packet received on the at least one parallel dedicated channel.

29. The communication system of claim 18, wherein the communication system is a time division multiple access type of cellular radio network, the shared channel is a timeslot, and the data packets are radio bursts to be sent in the timeslot and include at least the training sequence and data.

30. The communication system of claim 29, wherein the communication system uses a time division duplex principle on a carrier of the shared channel.

31. The communication system of claim 29, wherein the at least one transmitter sends a plurality of radio bursts simultaneously in the timeslot based on a code division multiple access principle using different spreading codes and uses different training sequences in radio bursts for at least one of different receivers and different receiver groups.

32. The communication system of claim 31, wherein the at least one receiver simultaneously receives the plurality of radio bursts with different spreading codes and accepts at least one radio burst having a training sequence that the at least one receiver identifies.

33. The communication system of claim 32, wherein the at least one receiver identifies a radio burst based on both the training sequence and the spreading code.

34. A transmitter in a communication system, wherein the transmitter is
    arranged to transmit on a shared channel data packets provided with a training sequence, and
    the transmitter is arranged To transmit on the shared channel data packets addressed to different receivers and receiver groups with different training sequences, wherein data packets addressed to at least one of different receivers and different receiver groups are provided with different training sequences.

35. A transmitter as claimed in claim 34, characterized in that the transmitter is a base station.

36. A receiver in a communication system, wherein the receiver is
    arranged to receive on a shared channel data packets provided with a training sequence, and the receiver is arranged to generate a channel estimate on the basis of the training sequence,
    the receiver is arranged to fixer process data packets whose training sequence the receiver identified, and
    the receiver is arranged to ignore the data packets whose training sequence the receiver does not identify, wherein data packets addressed to at least one of different receivers and different receiver groups are provided with different training sequences.

37. A receiver as claimed in claim 36, characterized in that the receiver is a mobile phone.

38. A method of identifying information addressed to a user in a communication system, the method comprising:
    providing data packets addressed to at least one of different receivers and different receiver groups with different training sequences particular to the at least one of different receivers and different receiver groups; and
    transmitting, the data packets provided with the different training sequences particular to the at least one of different receivers and different receiver groups on a shared channel.

39. A method of identifying information addressed to a user in a communication system, the method comprising,
    receiving a training sequence particular to a receiver;
    generating a channel estimate value based on the received training sequence;
    receiving, on a shared channel on which at least one receiver receives data packets, data packets including data packets provided with the training sequence particular to the receiver;

attempting to identify the received data packets addressed to the receiver by processing the received data packets having a training sequence that the first receiver identifies and ignoring received data packets having a training sequence that the first receiver does not identify.

40. A module for a transmitter in a communication system, wherein the module is
    arranged to provide each data packet for transmission by the transmitter on a shared channel, with a training sequence, and
    the module is arranged to provide each data packets addressed to at least one of, different receivers and receiver groups with different training sequences for transmission by the transmitter on the shared channel.

41. A module for a receiver in a communication system, wherein The module is
    arranged to generate a channel estimate based on a training sequence provided with data packets received on a shared channel,
    arranged to further process data packets whose training sequence the module identified, and
    arranged to ignore the data packets whose training sequence the module does not identify, wherein data packets addressed to at least one of different receivers and different receiver groups are provided with different training sequences.

* * * * *